(12) United States Patent
Dunlop

(10) Patent No.: US 10,780,834 B2
(45) Date of Patent: Sep. 22, 2020

(54) APPARATUS FOR CONTAINING DEBRIS WITHIN VEHICLE INTERIOR DOOR COMPARTMENTS

(71) Applicant: Matthew James Dunlop, Pickerington, OH (US)

(72) Inventor: Matthew James Dunlop, Pickerington, OH (US)

(*) Notice: Subject to any disclaimer, the term of this patent is extended or adjusted under 35 U.S.C. 154(b) by 143 days.

(21) Appl. No.: 16/001,357

(22) Filed: Jun. 6, 2018

(65) Prior Publication Data

US 2018/0354426 A1 Dec. 13, 2018

Related U.S. Application Data

(60) Provisional application No. 62/518,774, filed on Jun. 13, 2017.

(51) Int. Cl.
*B60R 7/04* (2006.01)
*B60N 3/08* (2006.01)

(52) U.S. Cl.
CPC ............... *B60R 7/046* (2013.01); *B60N 3/08* (2013.01)

(58) Field of Classification Search
CPC ........ B60N 3/101; B60N 3/102; B60N 3/103; B60N 3/105; B60N 3/106; B60N 3/10; B60N 3/08; B65F 1/04; B65F 1/08; B65F 1/085; B65F 1/16; B65F 1/1607; B65F 2001/1653; B60R 7/046
USPC .............. 296/37.16, 152; 224/926, 928
See application file for complete search history.

(56) References Cited

U.S. PATENT DOCUMENTS

| | | | |
|---|---|---|---|
| 4,453,760 A * | 6/1984 | Hira | B60R 7/046 296/37.13 |
| 6,116,672 A * | 9/2000 | Cannon | B60R 7/046 224/547 |
| 7,192,074 B2 | 3/2007 | DePue et al. | |
| 7,594,686 B2 | 9/2009 | Augustyn | |
| 8,701,951 B2 | 4/2014 | Lucas et al. | |
| 9,004,569 B2 | 4/2015 | Hamamoto et al. | |
| 9,114,839 B2 | 8/2015 | Langenbacher et al. | |
| 2005/0224568 A1 * | 10/2005 | Waugh | B60N 3/08 232/43.5 |
| 2005/0248055 A1 * | 11/2005 | Youngs | B29C 45/0017 264/250 |
| 2007/0119855 A1 * | 5/2007 | Ishida | B60N 3/106 220/737 |
| 2008/0118188 A1 * | 5/2008 | Jones | B65F 1/0006 383/33 |
| 2015/0001363 A1 * | 1/2015 | Bohlke | B60N 3/106 248/311.2 |
| 2016/0229354 A1 * | 8/2016 | Bettzuege | B60R 11/0252 |
| 2017/0274808 A1 * | 9/2017 | Krishnan | A47G 23/0208 |
| 2018/0126919 A1 * | 5/2018 | Huebner | B60N 3/105 |

(Continued)

*Primary Examiner* — Gregory A Blankenship
(74) *Attorney, Agent, or Firm* — Standley Law Group LLP; James L. Kwak

(57) ABSTRACT

A removable cover for maintaining debris and other items in an inner door compartment of a vehicle. The removable cover can be removed from the door compartment and when in use prevents debris from blowing out of the door compartment. The removable cover has an opening with flexible flaps for allowing the user to place items in the door compartment during use. The removable cover can be used with a debris wall or dam that prevents debris from moving from a storage area of the door compartment to a drink holder area.

25 Claims, 6 Drawing Sheets

Device in Use (no debris in door compartment)

(56) References Cited

U.S. PATENT DOCUMENTS

| | | | | |
|---|---|---|---|---|
| 2018/0222293 A1* | 8/2018 | Thomas | ................. | E05B 83/28 |
| 2018/0354426 A1* | 12/2018 | Dunlop | ................. | B60R 7/046 |
| 2019/0299868 A1* | 10/2019 | Sekozawa | ................ | B60R 7/04 |
| 2019/0366901 A1* | 12/2019 | Stoner | ................. | B65F 1/1415 |

* cited by examiner

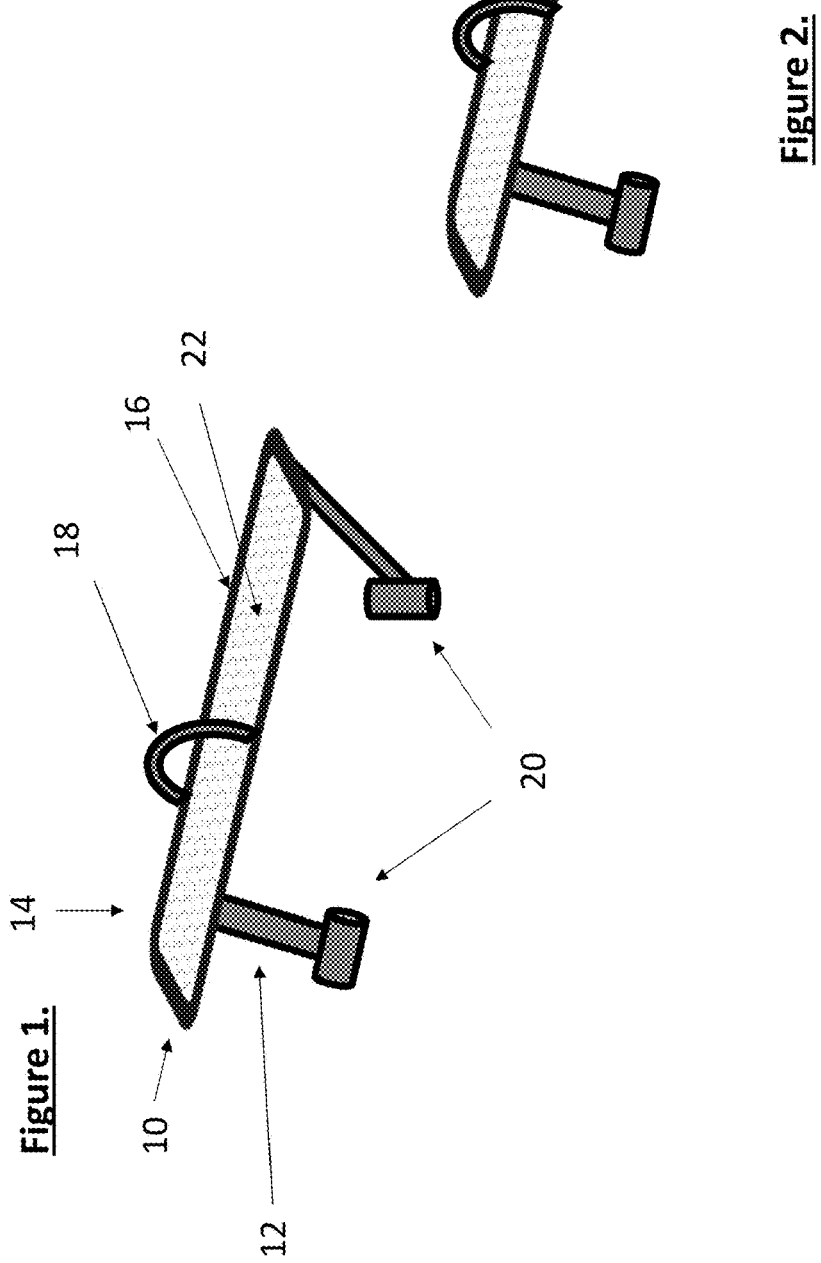

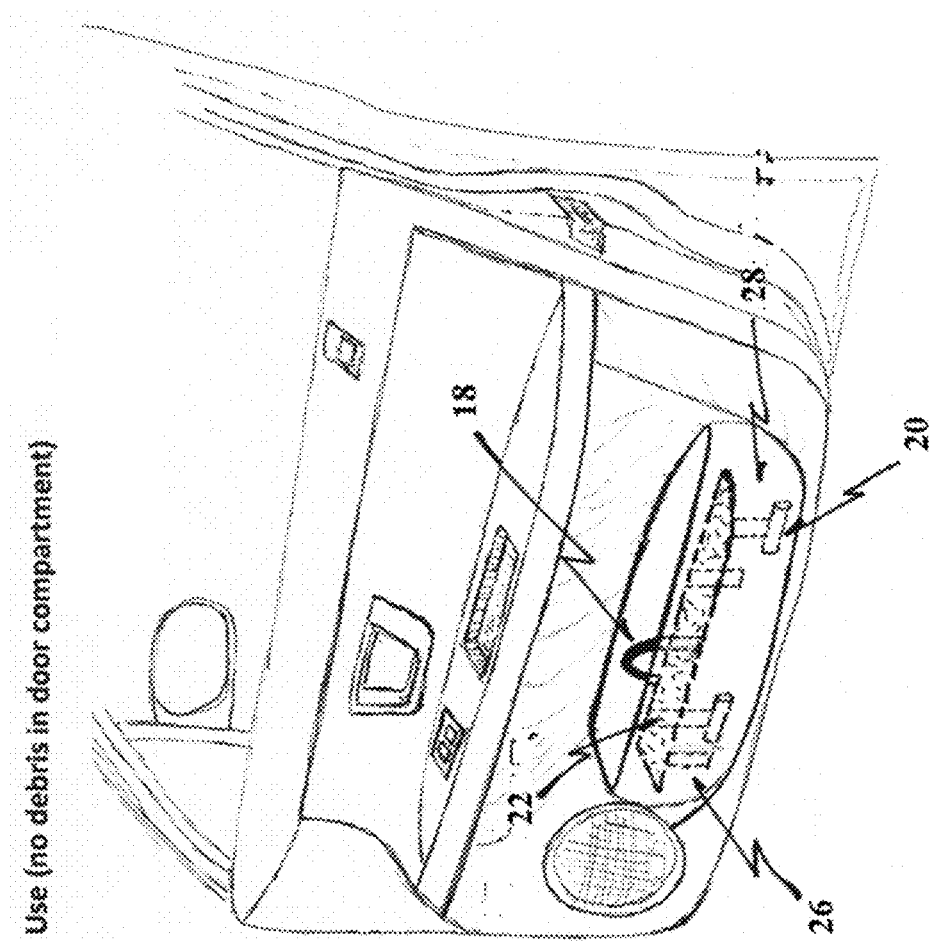

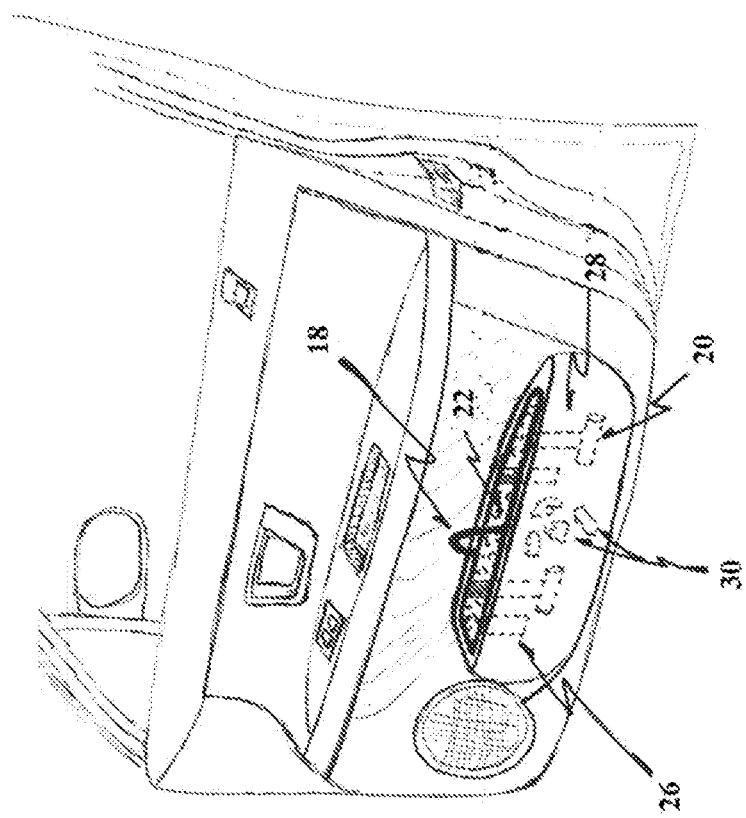
Figure 4 - Device in Use (door compartment nearly full of debris)

APPARATUS FOR CONTAINING DEBRIS WITHIN VEHICLE INTERIOR DOOR COMPARTMENTS

This application claims priority to U.S. Provisional Application No. 62/518,774, filed Jun. 13, 2017, the content of which is hereby incorporated by reference as if fully recited herein.

BACKGROUND OF THE INVENTIVE FIELD

The invention relates to an apparatus that, when inserted, forms a screening cover for the open compartments commonly found on the inside lower portion of motor vehicle doors. Particularly, the device enhances containment and gently compacts items such as discarded trash and paper and offers a slightly increased capacity. Specifically, the device prevents or greatly reduces occasions when wind lifts paper or other light items from these compartments. Further, the invention reduces the annoyance of unwanted airborne objects within an operating motor vehicle, with the added benefit of enhanced safety.

A problem commonly faced by vehicle owners occurs when light objects (such as paper waste) are lifted from side door compartments and blown around within the vehicle. This often happens when a window or sunroof is opened or a convertible top is open to the outside air. The problem also occurs when a person opens a vehicle door thereby exposing the inside of the door and items in the compartment directly to the prevailing wind. A solution to this problem is provided by the apparatus embodied in the current invention.

SUMMARY OF THE GENERAL INVENTIVE CONCEPT

The present invention enhances containment of vehicle door pocket contents. Commonly these are small items of paper such as receipts, gum wrappers, napkins, and toll tickets. The device achieves this result by corralling and covering the contents commonly placed in the compartment. The general construction, dimensions and shape of the device is preferably customized to each specific door compartment design. The device maintains a stable horizontal orientation over the door pocket contents by employing downward projecting leg/guides. These leg/guides extend downward from the device top cover. In one embodiment, when the door pocket is empty, or nearly empty, the guides may contact the bottom of the compartment. As the compartment is filled, and more material is placed under the cover surface, the device will float up while maintaining its orientation within the door compartment. As this occurs the device will gently compact and corral the contents while preventing or greatly reducing the likelihood of wind lifting paper of other light items out of the compartment.

In one embodiment of the present invention, the invention is an apparatus for containing debris within a vehicle interior door compartment, the apparatus comprising: a removable cover for covering the door compartment for keeping debris within the door compartment; at least one first leg portion attached to the cover for providing support to the removable cover; an opening in the removable cover for passing debris through the removable cover into the door compartment; and at least one flexible flap attached to one edge of the opening adapted to cover the opening while allowing debris to be passed through the opening.

In one embodiment, the first leg portion is shorter than the depth of the door compartment so that the cover resides completely in the compartment when the compartment is empty or has little debris; and wherein the apparatus is adapted to move upwards within the door compartment as the door compartment fills up with debris. It is preferred that the apparatus have a second leg portion, and wherein the second leg portion is shorter than the depth of the door compartment so that the cover resides completely in the compartment when the compartment is empty or has little debris. It is appreciated that the invention can be comprised of a plurality of leg portions depending on the size of the door compartment and the support needed.

One embodiment of the invention is further comprised of weights attached to the end of the leg portions for weighing the apparatus down; a handle connected to the removable cover; and wherein the removable cover is comprised of an edge portion that forms the perimeter of the removable cover. The edge portion is preferably constructed of a material that is rigid enough to support connection to the handle while still maintaining a soft outer surface that contacts an inner part of the door compartment without creating unwanted audible rattles.

In one embodiment, the handle portion is a tab that extends from the removable cover, having one end that ends at the opening for guiding a user to the opening.

The apparatus of the present invention can also be used with a debris wall or dam apparatus comprised of a wall portion having a catch portion and a stabilizing plate, the wall portion adapted to prevent debris from moving from a storage area of the door compartment to a drink holder area of the door compartment.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 illustrates a side perspective view of one embodiment of the containment device of the present invention;

FIG. 2 illustrates a side perspective view of another embodiment of the containment device of the present invention having a drink facilitator leg/guide;

FIG. 3 illustrates one embodiment of the present invention installed in a lower side compartment of a vehicle door when there is little or no debris in the door compartment;

FIG. 4 illustrates the embodiment of the present invention as shown in FIG. 3 installed in a lower side compartment of a vehicle door when the door compartment is nearly full of debris

DETAILED DESCRIPTION OF EXEMPLARY EMBODIMENT(S)

Figure 5:
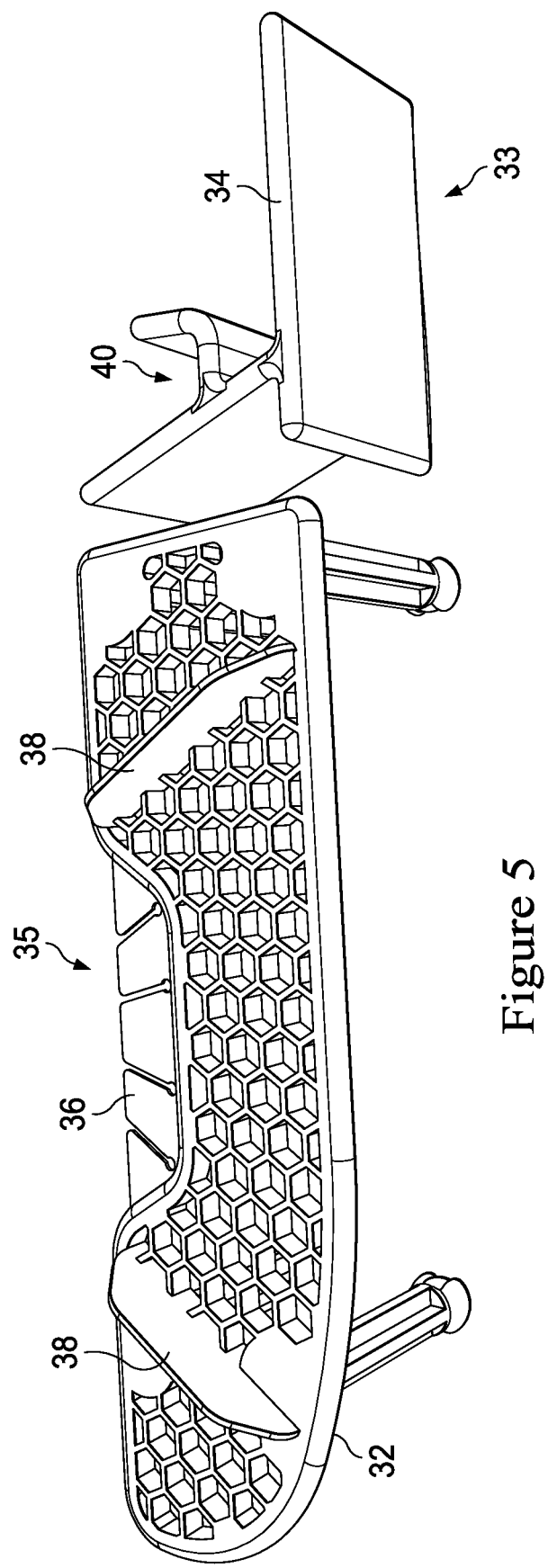
FIG. 5 illustrates another embodiment of the containment device of the present invention, with a debris wall or dam portion.

The following detailed description of the exemplary embodiments refers to the accompanying figures that form a part thereof. The detailed description provides explanations by way of exemplary embodiments. It is to be understood that other embodiments may be used having mechanical changes that incorporate the scope of the present invention without departing from the spirit of the invention.

FIG. 1 illustrates a side perspective view of one embodiment of the containment device 10 of the present invention. The device maintains a stable horizontal orientation over the door pocket/compartment contents by employing downward projecting leg/guides 12. These legs/guides extend downward from the device top cover 14. In one embodiment, the top cover has an edge portion 16 that forms the perimeter of the cover. The edge portion is preferably constructed of a material that is rigid enough to support connection to the cover handle 18 and device leg/guides, while still maintaining a soft outer surface that contacts the inner part of the door compartment without creating unwanted audible rattles within the vehicle. The edge portion can be made from a combination of plastic, metal, rubber or wood. In this embodiment, the cover is comprised of a mesh interior portion to allow the user to view below the cover and into the door compartment when the cover is in place.

In one embodiment, when the door pocket is empty, or nearly empty, the legs/guides may contact the bottom of the compartment. In one embodiment, the legs/guides are shorter than the depth of the compartment so that the cover resides completely in the compartment when the compartment is empty or has little debris 30 or items. As the compartment is filled, and more material is placed under the cover surface, the device will float up the compartment while maintaining its orientation within the door compartment. In other words, as more items are placed at the bottom of the door compartment, the device is pushed up by the items below the cover (top) causing the cover to move up in the door compartment. As this occurs, the device will gently compact and corral the contents while preventing or greatly reducing the likelihood of wind lifting paper of other light items out of the compartment. The number of legs/guides attached to the device varies based on the size and dimensions of the door compartment. For example, the larger the door compartment, the device should be configured with more legs/guides than smaller door compartments. The legs/guides can be unweighted 26 or weighted 28 legs/guides. Weights 20 may also be placed at the ends of all or some of the legs/guides to provide device stability and to help keep the device from blowing out of the door compartment from wind or being easily moved by other forces. In this embodiment, the leg/guides serve an anchoring function and are weighted in a manner that enhances stability within the compartment. In this embodiment, denser (heavier) material is employed in the entirety of the leg/guides or weighted material (like metal) embedded in the lower part of the leg/guides. In the embodiment of FIG. 1, the present invention is also comprised of a handle for grabbing and lifting the device out of the door compartment.

In the preferred embodiment, the legs work through constant or occasional contact with both the bottom and/or the interior sides of the compartment. One intent of the legs is to optimize the orientation and functioning of the top/cover. The legs function to contact any interior compartment surface and/or the debris itself in a manner that keeps the cover from flipping over and also prevents any significant tilting of the cover within the door compartment. Significant tilting would compromise the containment function of the device.

In one embodiment, the legs/guides may move or flex to maintain outward pressure against the inside walls within the compartment. The purpose of this flexing is to facilitate stability, proper orientation, and proper up and down movement of the device within the door compartment. For example, the legs may be designed wider than the compartment opening and require the operator to gently compress the legs while inserting the device. This flexibility is achieved through use of the leg materials employed or by a mechanism such as a spring. Once the device is fully inserted, and the legs have returned to the at-rest state, the legs may make gentle contact or occasional contact with the inside compartment wall. This compression-expansion leg effect may facilitate the stability and proper cover orientation in any of the other embodiments—snap-to-fit, full-length legs, or floating device (short legs.)

Operation of the device is achieved by first inserting it in the door compartment over any pre-existing contents. Subsequently, when items need to be disposed or placed in the compartment, the device cover part would be lifted manually by a tab or small handle with one hand while depositing items under the device cover with the other hand.

The density and weight of the device materials are engineered to optimize effectiveness. Use of various materials with varied densities is incorporated to insure sufficient weight and rigidity to enhance the stability and reliability of the device. Materials used may include rubber, plastics, metals, or other materials. The design of the cover (top) portion of the device may be a solid surface or may incorporate an open weave, mesh 22, such that the user can see the items below it. Softer materials (rubber-like) may be incorporated on the cover and guide-leg edges to minimize audible rattles within the vehicle.

Since many door compartments narrow with increased depth, thereby becoming more restricted at greater depths, the device may not fit tightly within the compartment walls, but will instead likely have some small to modest gaps between the cover edges and the compartment walls. Specific internal compartment dimensions and the targeted functionally will drive each specific optimized design.

While some generic device designs may fit many vehicle doors, door compartments are significantly varied. Therefore, the device can be custom designed specifically for each unique vehicle door compartment shape and configuration. In fact, since the vehicle door compartments are of extremely varied shapes, three-dimensional (3D) measurement and modern 3D printing techniques can be used to quicken the design, testing, and production cycles. Use of various cover edge shapes and materials will aid in corralling contents in the compartment to prevent displacement by the wind. The edge of the cover portion of the device may curve or extend downward in a way that more effectively catches the contents of the compartment. Edges may also employ flexible scalloped edges, or bristles that discourage contents from exiting between the compartment wall and the device cover. Containment of the contents under the force of moving air or gusts of wind is important to the device design.

In some embodiments, a clip or fastening tool may be incorporated to allow users to secure sunglasses on top of the device. Various colors may be offered to accommodate interior vehicle color schemes and owner preference.

Some door compartments have incorporated drink holders. Therefore, in some embodiments, use of this device may maintain or enhance this feature. Through targeted design, separation between the drink holder and other portions of the storage pocket may be preserved or even improved. FIG. 2 illustrates a side perspective view of another embodiment of the containment device of the present invention having a drink facilitator leg/guide 24. In other embodiments, possibly a second option for purchase, the drink holder portion of the compartment may be used in a combined debris gathering mode. The drink bottle holding function may be eliminated in favor of extending the top/cover over the designated bottle holding area, thereby increasing the debris gathering capacity.

The present invention is adapted to be manually removed from the door compartment. Removability offers the users flexibility to use the compartment as originally designed or as enhanced by the current device. Removability of the apparatus also aids cleaning of both the device and the door compartment. The device is preferably dishwasher safe.

FIG. 3 illustrates one embodiment of the present invention installed in a lower side compartment of a vehicle door when there is little or no debris in the door compartment. FIG. 4 illustrates the embodiment of the present invention as shown in FIG. 3 installed in a lower side compartment of a vehicle door when the door compartment is nearly full of debris.

As shown in FIG. 3, the device rests on the bottom of the compartment ready for debris to be placed under the top/cover. In this embodiment, the top/cover rests below the level of the top edge door compartment because the legs/guides are shorter than the depth of the door compartment. The device handle is conveniently positioned, visible, and ready for use. In this embodiment, some of the legs/guides do not have weights while other legs/guides do.

The device is used by lifting the top cover handle and placing items below the top/cover and into the door compartment. The debris below the cover is gently compacted and corralled by the weight of the device and leg/guides. This compacting effect slightly increases the capacity of the compartment. As time passes, and the vehicle owner opens the car door, or drives with the windows open, the operator can be reassured that the device is restricting debris movement. Items are not easily lifted into the air within the car cabin or flying out of the vehicle. Distractions are minimized as safety is enhanced. Littering is also reduced. Once the door compartment is full and the device reaches the position as illustrated in FIG. 4 (near top edge of the door compartment), the device would soon be removed and the compartment emptied.

In the embodiment of FIGS. 3 and 4, the legs/guides are shorter than the full depth of the door compartment. For example, if the legs/guides are 3 inches long but the compartment is 6 inches deep, then the device cover/top would rest at 3 inches below the compartment rim when there is no items or debris in the door compartment. The legs and apparatus are completely inside the compartment. As material is placed under the cover and inside the compartment the device will rise as supported physically by the discarded items below. Positioning of the legs and gentle contact with the inside walls of the compartment will stabilize the device enabling the cover/top to maintain a generally horizontal orientation.

As illustrated in FIGS. 3 and 4, the device is adapted to move up and down inside the compartment based on the amount of items or debris in the door compartment. In this embodiment, the device works through the gentle physical contact (friction) with the compartment inside walls and the contents of the compartment.

The user can empty the compartment when the device cover/top is close or rides above the compartment edge. If the compartment gets too full, contents may spill out of the compartment. The cover can be configured to restrict the ability of the cover/top to easily rise above the edge of the compartment. The device cover can be configured as a flat piece but it may also curve in a gently convex fashion when viewed from above. This configuration would slightly increase capacity.

To place items in the compartment when the device is below the rim, the user lifts the handle above the rim level and places the item below the cover and into the compartment, before lowering/returning the device to a natural resting position with stability aided by gravity and friction, and protected from the wind, inside the compartment.

Many door compartments have a restricted opening, so it may not be feasible to insert leg/guides that measure the full depth of the compartment. Sometimes the door handle encroaches on the compartment area or the curvature of the door trim encroaches on the ability to insert a devise with long leg/guides. However, in another embodiment of the present invention, the length of the leg/guides are the full depth of the compartment so that the cover/top can remain near the top edge of the compartment (except when lifted manually).

Figure 6:
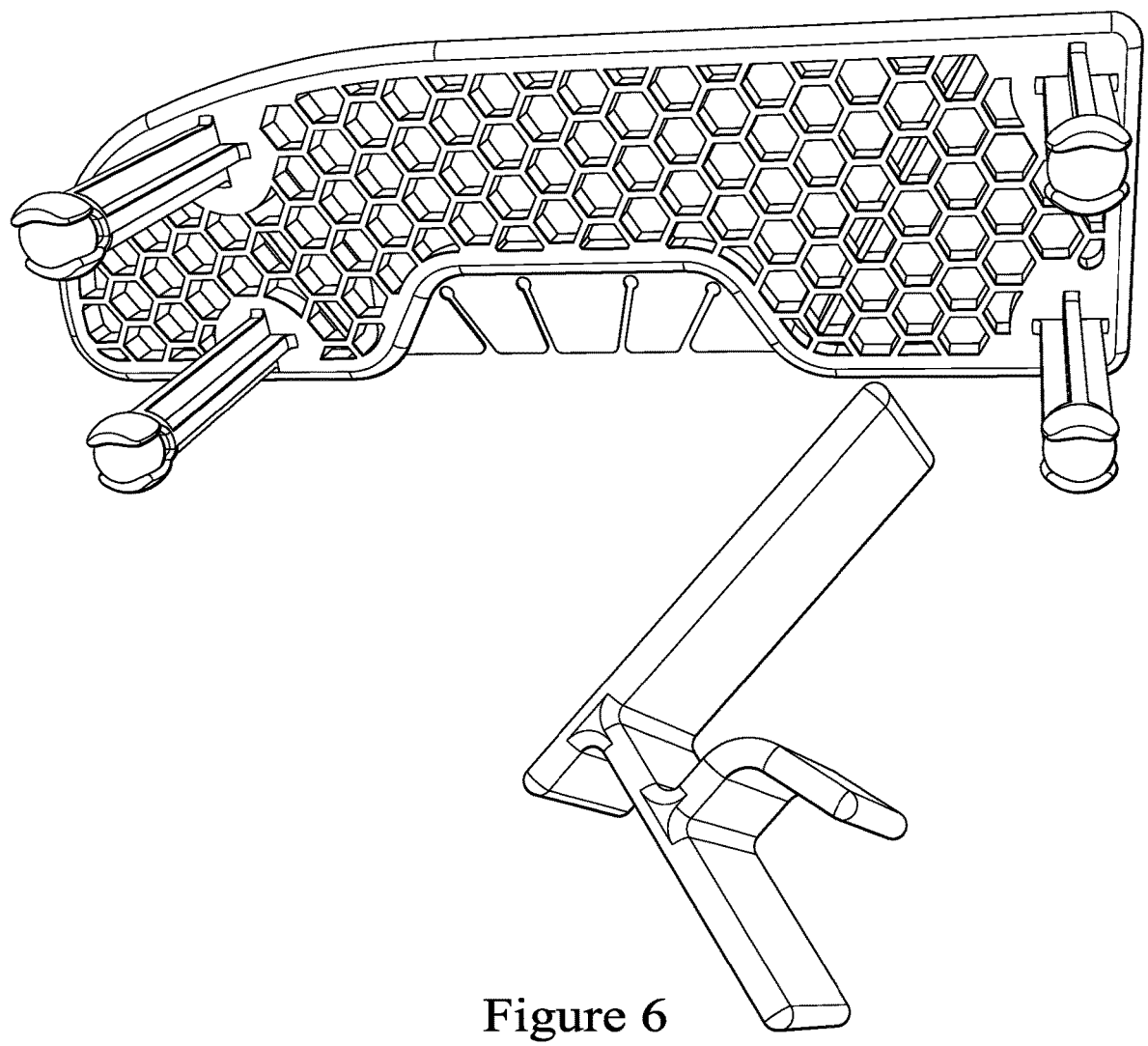
FIG. 6 illustrates another view of the devices of FIG. 5.

FIG. 5 illustrates another embodiment of the containment device 32 of the present invention, with a debris wall or dam portion 33. This embodiment is preferably used where the door compartment of a truck has a storage compartment combined with a drink/cup holder section. The debris wall or dam portion fits into one protruding portion of the cup holder and provides a wall or dam for preventing debris from the storage section of the door compartment from entering the drink/cup holder section of the door compartment. FIG. 5 illustrates the direction and orientation of the containment device and the wall portion as it would reside in a door compartment. FIG. 6 illustrates another view of the devices of FIG. 5 (illustrating a bottom perspective view of the containment device).

The embodiment of FIG. 5 illustrates a "pass-through" feature that allows users to insert debris into the door compartment when the containment device is in place. In the preferred embodiment, a cut-out, or opening 35, is made into the cover that is than covered by flexible flaps 36 that allow users to pass items through the opening 35 ("pass-through" feature), thus achieving debris containment without lifting the containment device out of the door compartment. While, in other cases, the user may have to lift the apparatus to place items in the compartment below, this feature eliminates the need to lift the apparatus when depositing items, especially small paper-like debris. This feature may also eliminate the need to make visual contact. Users may be able to use this feature based on tactile sensation (non-visual) and achieve the pass-through of debris or other items with only one hand. This is especially useful to a driver of a vehicle. Of course, this operation is not advised while the vehicle is in motion.

Exact positioning and specific material used, to form the pass-through, are dictated by door compartment geometry and other design considerations. In FIG. 5, flexible or plastic flap portions (five flaps are shown), are attached to one edge of the opening. The flaps can bend from their attachment point, allowing a user to insert debris into the door compartment. Once the debris is placed through the "pass-through" opening, the flaps bend back into place covering the opening in the cover of the containment device. In the preferred embodiment, the opening 35 is placed at an edge of the cover that meets the inside door wall of the vehicle. In this embodiment, these flaps also allow the user to find the flexible pass-through feature by feeling or probing by hand for the area where the inside door wall and top edge of the apparatus meet.

The embodiment of the containment device illustrated in FIG. 5, is also comprised of handle-tab-guide portions 38. The "handle-tabs" 38 function as a grippable feature for lifting the containment device to place items below it or for lifting and removing the device, such that the door compartment can be emptied of debris. The second characteristic, the "guide," of the "handle-tab-guide" will work in concert with the pass-through feature such that the user can feel and find the pass-through location on the apparatus without the need for visual contact. A user's hand may contact the guide, and based on memory, the user will adjust their reach to find the pass-through location. Once located, the operator uses the hand that is grasping debris to tuck these items through the flexible material (e.g., flaps).

Many vehicle side door compartments have drink holders or other features formed by one congruous plastic molding. The debris/storage area and the drink holder area typically share a compartment floor. A common problem is that items often migrate from the larger general debris/storage area to the area intended for holding drinks/cups. When operators chose to use the drink holder they may be frustrated to find blocking debris. The debris dam feature stops this undesired migration of items; effectively dividing the compartment for specific intended purposes—drink holding and debris holding. The debris dam is precisely designed based on the specific geometry of the door compartment. In the example illustrated, the debris dam has a stabilizing plate 34 that anchors on the inside wall of the front door compartment, and a curved hook catch portion 40 for engaging a cup holder protrusion portion 42. The curved hook portion engages the cup holder protrusion portion and is anchored in place by the stabilizing plate against the wall of the door compartment, thus securing the dam in position. In other door geometries, the debris dam may incorporate a stabilizing plate on the floor of the compartment such that the drink itself, if inserted, rests on top of the stabilizing plate. Other stabilizing configurations may also be useful. The key is finding the best stabilization of the vertical dam so that it may effectively divide the compartment and hold back the movement of rogue debris into the drink holder area.

Figure 7:
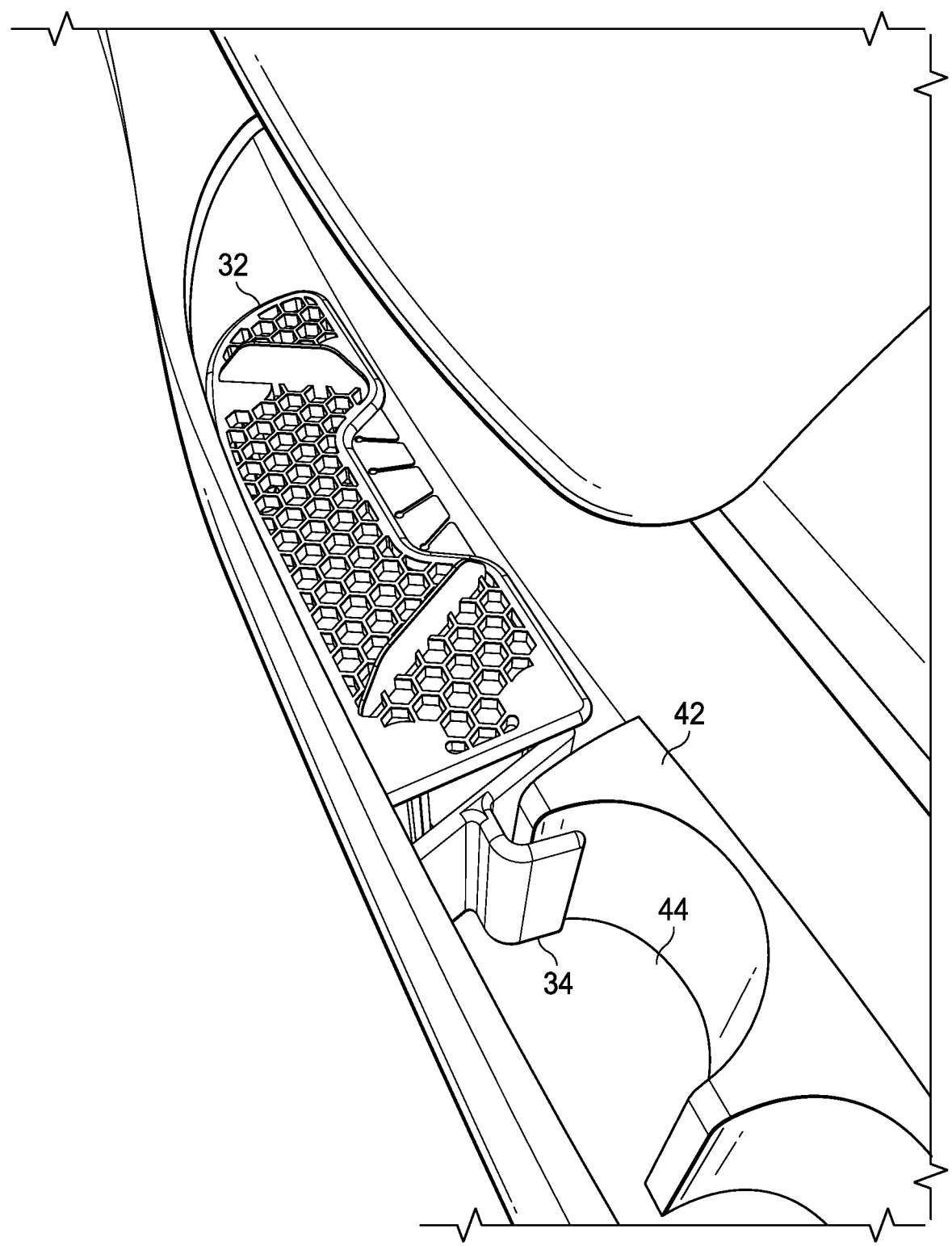
FIG. 7 illustrates the devices of FIG. 5 installed in a door compartment of a vehicle.

Use of the debris dam will enhance the use and useful capacity of the debris containment device. Together, the cover/containment apparatus and the debris-wall/dam work together to contain debris within the storage/debris area of the door compartment. While the debris dam is designed for use with the cover apparatus, use of the debris dam without the cover apparatus could also serve the independent function of stopping the migration of items between the storage area and the cup/drink holder area 44 of the door compartment. FIG. 7 illustrates the devices of FIG. 5 installed in a door compartment of a vehicle.

Some door compartment geometries may lend themselves to an apparatus that fits more snuggly or even snaps into position. This snap-in-place characteristic is different from the free-floating option that relies on leg-weights and leg-to-debris interaction to anchor and stabilize the apparatus. While both options can work well, this snap in place feature may enhance the stability and functionality if the vehicle door geometry will allow it.

In another embodiment of the invention, the debris containment device can be configured with other storage compartments for storing other items such as coins, pens or gum. The additional storage compartments can be placed under a portion of the cover or may be adapted to hang outside the door compartment.

Use of the devise and various designs will improve the appearance of the door compartment by shielding or greatly reducing visual contact with debris in the compartment. Use of various materials, colors, and physical designs can achieve this purpose.

While initially designed for vehicle aftermarket application, some vehicle manufactures may see value in partnering with this inventor to form integrated designs with the same core functionality. While certain embodiments of the present invention are described in detail above, the scope of the invention is not to be considered limited by such disclosure, and modifications are possible without departing from the spirit of the invention.

What is claimed is:

1. An apparatus for containing debris within a vehicle interior door compartment, the apparatus comprising:
   a removable cover for covering the door compartment for keeping debris within the door compartment;
   a first leg portion attached to the removable cover for providing support to the removable cover;
   wherein the first leg portion is shorter than the depth of the door compartment so that the removable cover resides completely in the compartment when the compartment is empty or has little debris; and
   wherein the apparatus is adapted to move upwards within the door compartment as the door compartment fills up with debris.

2. An apparatus according to claim 1, wherein the removable cover is comprised of a mesh cover that is see-through.

3. An apparatus according to claim 1, further comprising:
   a second leg portion, and wherein the second leg portion is shorter than the depth of the door compartment so that the removable cover resides completely in the compartment when the compartment is empty or has little debris.

4. An apparatus according to claim 1, further comprising:
   a weight attached to the end of the first leg for weighing the apparatus down.

5. An apparatus according to claim 3, further comprising:
   a weight attached to the end of the second leg for weighing the apparatus down.

6. An apparatus according to claim 1, further comprising:
   a handle connected to the removable cover.

7. An apparatus according to claim 6, wherein the removable cover is comprised of an edge portion that forms the perimeter of the removeable cover.

8. An apparatus according to claim 7, wherein the edge portion is constructed of a material that is rigid enough to support connection to the handle while still maintaining a soft outer surface that contacts an inner part of the door compartment without creating unwanted audible rattles.

9. An apparatus according to claim 1, further comprising:
   an opening in the removeable cover for passing debris through the removeable cover into the door compartment;
   at least one flexible flap attached to one edge of the opening adapted to cover the opening while allowing debris to be passed through the opening.

10. An apparatus according to claim 9, further comprising:
    at least one handle portion attached to the removeable cover.

11. An apparatus according to claim 10, wherein the handle portion is a tab that extends from the removeable cover, having one end that ends at the opening for guiding a user to the opening.

12. An apparatus according to claim 11, further comprising:

a wall portion having a catch portion and a stabilizing plate, the wall portion adapted to prevent debris from moving from a storage area of the door compartment to a drink holder area of the door compartment.

13. An apparatus according to claim 1, wherein the cover is a screening surface that resides within the door compartment.

14. An apparatus for containing debris within a vehicle interior door compartment, the apparatus comprising:
- a removable cover for covering the door compartment for keeping debris within the door compartment;
- a first leg portion extending downward from the removable cover for providing support to the removable cover;
- an opening in the removable cover for passing debris through the removable cover into the door compartment;
- at least one flexible flap attached to one edge of the opening adapted to cover the opening while allowing debris to be passed through the opening; and
- a weighted portion at the end of the first leg portion for weighing the apparatus down.

15. An apparatus according to claim 14, wherein the first leg portion is shorter than the depth of the door compartment so that the removable cover resides completely in the compartment when the compartment is empty or has little debris; and
- wherein the apparatus is adapted to move upwards within the door compartment as the door compartment fills up with debris.

16. An apparatus according to claim 14, further comprising:
- a second leg portion, and wherein the second leg portion is shorter than the depth of the door compartment so that the removable cover resides completely in the compartment when the compartment is empty or has little debris.

17. An apparatus according to claim 16, further comprising:
- a weight attached to the end of the second leg for weighing the apparatus down.

18. An apparatus according to claim 14 further comprising:
- a handle connected to the removable cover.

19. An apparatus according to claim 18, wherein the removable cover is comprised of an edge portion that forms the perimeter of the removable cover.

20. An apparatus according to claim 19, wherein the edge portion is constructed of a material that is rigid enough to support connection to the handle while still maintaining a soft outer surface that contacts an inner part of the door compartment without creating unwanted audible rattles.

21. An apparatus according to claim 18, wherein the handle portion is a tab that extends from the removable cover, having one end that ends at the opening for guiding a user to the opening.

22. An apparatus according to claim 14, further comprising:
- a wall portion having a catch portion and a stabilizing plate, the wall portion adapted to prevent debris from moving from a storage area of the door compartment to a drink holder area of the door compartment.

23. An apparatus according to claim 14, wherein the cover is removable from the door compartment.

24. An apparatus for preventing debris from moving from a storage area of a door compartment to a drink holder area of the door compartment, the drink holder area having a protrusion portion, the apparatus comprising:
- a wall portion having a catch portion;
- a stabilizing plate for engaging an inner wall of the door compartment;
- wherein the catch portion is adapted to engage the protrusion portion of the drink holder area;
- wherein the wall portion is adapted to prevent debris from moving from a storage area of the door compartment to the drink holder area of the door compartment when the catch portion is engaged to the protrusion portion and the stabilizing plate is engaged to the inner wall of the door compartment.

25. An apparatus according to claim 24, further comprising:
- a removable cover for covering the door compartment for keeping debris within the door compartment;
- a first leg portion attached to the removable cover for providing support to the removable cover;
- an opening in the removable cover for passing debris through the removable cover into the door compartment; and
- at least one flexible flap attached to one edge of the opening adapted to cover the opening while allowing debris to be passed through the opening.

* * * * *